United States Patent
Tai

(10) Patent No.: US 11,008,459 B2
(45) Date of Patent: May 18, 2021

(54) GLASS FLAKES AND RESIN COMPOSITION

(71) Applicant: Nippon Sheet Glass Company, Limited, Tokyo (JP)

(72) Inventor: Nobuaki Tai, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 125 days.

(21) Appl. No.: 16/075,523

(22) PCT Filed: Feb. 8, 2017

(86) PCT No.: PCT/JP2017/004608
§ 371 (c)(1),
(2) Date: Aug. 3, 2018

(87) PCT Pub. No.: WO2017/141792
PCT Pub. Date: Aug. 24, 2017

(65) Prior Publication Data
US 2019/0040255 A1    Feb. 7, 2019

(30) Foreign Application Priority Data

Feb. 18, 2016 (JP) .............................. JP2016-028891

(51) Int. Cl.
| | | |
|---|---|---|
| C08L 77/06 | (2006.01) | |
| C08K 9/06 | (2006.01) | |
| C03C 17/30 | (2006.01) | |
| C03B 37/005 | (2006.01) | |
| C08K 9/04 | (2006.01) | |
| C08L 71/12 | (2006.01) | |
| C09C 3/08 | (2006.01) | |

(52) U.S. Cl.
CPC ............ *C08L 77/06* (2013.01); *C03B 37/005* (2013.01); *C03C 17/30* (2013.01); *C08K 9/04* (2013.01); *C08K 9/06* (2013.01); *C08L 71/12* (2013.01); *C09C 3/08* (2013.01); *C03C 2217/20* (2013.01); *C08K 2201/003* (2013.01)

(58) Field of Classification Search
CPC ........... C09C 3/08; C03C 17/28; C03C 17/30; C08K 9/06
See application file for complete search history.

(56) References Cited

U.S. PATENT DOCUMENTS

| | | | |
|---|---|---|---|
| 3,257,184 A | 6/1966 | Glaser | |
| 7,344,667 B2* | 3/2008 | Honma | B32B 5/08 264/136 |
| 8,383,531 B2 | 2/2013 | Fujiwara et al. | |
| 8,946,340 B2* | 2/2015 | Yagyu | C03B 37/005 428/402 |
| 2009/0088515 A1 | 4/2009 | Yagyu et al. | |
| 2010/0092527 A1 | 4/2010 | Maeda et al. | |
| 2013/0165585 A1* | 6/2013 | Tadepalli | B29C 70/504 524/606 |
| 2014/0080952 A1* | 3/2014 | Raman | B29C 48/297 524/265 |
| 2015/0337110 A1 | 11/2015 | Tai | |

FOREIGN PATENT DOCUMENTS

| | | |
|---|---|---|
| EP | 2664317 A1 | 11/2013 |
| JP | S41017148 B | 9/1966 |
| JP | S45003541 B | 2/1970 |
| JP | S59021533 A | 2/1984 |
| JP | S62109855 A | 5/1987 |
| JP | H02124732 A | 5/1990 |
| JP | H02503669 A | 11/1990 |
| JP | 2004011036 A | 1/2004 |
| JP | 2010269995 A | 12/2010 |
| JP | 2010270326 A | 12/2010 |
| JP | 2013151582 | 8/2013 |
| JP | 2014512323 | 5/2014 |
| WO | 8808412 A1 | 11/1988 |
| WO | 2006068255 A1 | 6/2006 |
| WO | 2007111221 A1 | 10/2007 |
| WO | 2008133042 A1 | 11/2008 |
| WO | 12026127 A1 | 3/2012 |
| WO | 2012096182 A1 | 7/2012 |
| WO | 2012134924 | 10/2012 |
| WO | 2013121756 A1 | 8/2013 |

OTHER PUBLICATIONS

International Search Report issued for International Patent Application No. PCT/JP2017/004608, dated May 16, 2017, 5 pages including English translation.

* cited by examiner

*Primary Examiner* — Vickey Nerangis
(74) *Attorney, Agent, or Firm* — Hamre, Schumann, Mueller & Larson, P.C.

(57) ABSTRACT

Glass flakes of the present invention include glass flake substrates and a coating covering at least a portion of the surface of each of the glass flake substrates and composed of a binder. The binder includes a lubricant other than silicone, or a lubricant and an aminosilane. The proportion of the lubricant in the binder is 30 mass % or less.

5 Claims, 2 Drawing Sheets

GLASS FLAKES AND RESIN COMPOSITION

TECHNICAL FIELD

The present invention relates to glass flakes and a resin composition including the glass flakes.

BACKGROUND ART

Glass flakes are typically and widely used in applications such as reinforcing materials for thermosetting resins and thermoplastic resins and fillers for anticorrosive lining.

For example, JP S62(1987)-109855 A describes a technique for incorporating glass flakes to a thermoplastic resin to improve its strength and dimensional stability. WO 2007/111221 A1, WO 2012/026127 A1, and WO 2013/121756 A1 describe incorporating granular glass flakes granulated using a binder or surface treatment agent to a thermoplastic resin.

Glass flakes, which are scale-shaped thin pieces and thus easily scattered, have a problem in that the workability is poor before incorporation to a thermoplastic resin. To incorporate glass flakes to a thermoplastic resin, an extruder is commonly used. Since glass flakes are bulky and have poor flowability, glass flakes have problems such as clogging a feed section and being poorly blended with a thermoplastic resin. In order to solve these problems, a technique for granulating glass flakes using a binder or surface treatment agent and then incorporating the granular glass flakes to a thermoplastic resin has been invented.

CITATION LIST

Patent Literature

Patent Literature 1: JP S62(1987)-109855 A
Patent Literature 2: WO 2007/111221 A1
Patent Literature 3: WO 2012/026127 A1
Patent Literature 4: WO 2013/121756 A1

SUMMARY OF INVENTION

Technical Problem

It is commonly known to incorporate glass flakes as a filler to a resin in order to provide a resin molded article having high strength and a low shrinkage factor. However, resin compositions obtained by incorporating glass flakes to resins have the following problems.

Since glass flakes are fine, resin compositions to which glass flakes are incorporated have low flowability during melting. As a result, depending on the resin type or molding conditions, problems arise in that a resin composition has a poor property of filling a fine cavity of a mold and that occurrence of jetting makes the compound ununiform, which causes stress concentration in the resultant resin molded articles and decreases the mechanical strength thereof. To ensure the flowability of the resin composition above a certain level, a resin having a low molecular weight has to be used as a resin to which glass flakes are incorporated, and consequently the range of selectable resins is very limited.

If glass flakes are granulated using a binder or surface treatment agent and then incorporated to a resin using an extruder with a feeder having an insufficient supply capability, the granular glass flakes are attached to a part of the extruder due to their poor lubricity when incorporated to the resin and cannot be blended well with the resin. This causes the resultant resin composition to have a portion where the proportion of the glass flakes is relatively high and a portion where the proportion of the glass flakes is relatively low. As a result, the effect of the glass flakes for imparting high mechanical strength to resin molded articles is decreased.

An object of the present invention is to provide glass flakes that, when incorporated to a resin, cause minimal decrease in the flowability of the resultant resin composition and that are thus capable of ameliorating the decrease in strength of resin molded articles and the deterioration in filling property of resin compositions. The present invention also aims to provide glass flakes unlikely to cause problems such as attachment to a part of an extruder used for the incorporation to a resin, smoothly fed, and capable of being easily incorporated to a resin. The present invention further aims to provide a resin composition capable of forming a resin molded article with high mechanical strength and having high flowability during melting and an excellent filling property.

Solution to Problem

The present invention provides glass flakes including:
glass flake substrates; and
a coating covering at least a portion of the surface of each of the glass flake substrates and composed of a binder, wherein
the binder contains a lubricant other than silicone, or a lubricant and an aminosilane, and
the proportion of the lubricant in the binder is 30 mass % or less.

The present invention also provides a resin composition including the above glass flakes of the present invention and a matrix resin.

Advantageous Effects of Invention

When incorporated to a resin, the glass flakes of the present invention cause a minimal decrease in the flowability of the resultant resin composition and are thus capable of ameliorating the decrease in strength of resin molded articles and the deterioration in filling property of resin compositions. Additionally, the glass flakes of the present invention are glass flakes unlikely to cause problems such as attachment to a part of an extruder used for the incorporation to the resin, smoothly fed, and capable of being easily incorporated to the resin. Furthermore, the resin composition of the present invention which includes such glass flakes of the present invention can form a resin molded article with high mechanical strength and has high flowability during melting and an excellent filling property.

DESCRIPTION OF EMBODIMENTS

Hereinafter, an embodiment of the present invention will be described in detail.

Glass flakes of the present embodiment include glass flake substrates and a coating covering at least a portion of the surface of each of the glass flake substrates and composed of a binder. The binder contains a lubricant other than silicone, or a lubricant and an aminosilane. The proportion of the lubricant in the binder is 30 mass % or less. When incorporated to a resin, such glass flakes of the present embodiment cause minimal decrease in the flowability of the resultant resin composition and that are thus capable of ameliorating the decrease in strength of resin molded articles and the deterioration in filling property of resin compositions. Additionally, the glass flakes of the present embodiment are unlikely to cause problems such as attachment to a part of an extruder used for the incorporation to the resin, smoothly fed, and capable of being easily incorporated to the resin. The glass flakes of the present embodiment may be bonded to each other by the coating composed of the binder to form granules.

The glass flake substrates used in the glass flakes of the present embodiment can be produced, for example, by so-called blow process as disclosed in JP S41(1966)-017148 B or JP S45(1970)-003541 B or so-called rotary process as disclosed in JP S59(1984)-021533 A or JP H02(1990)-503669 A.

Figure 1:
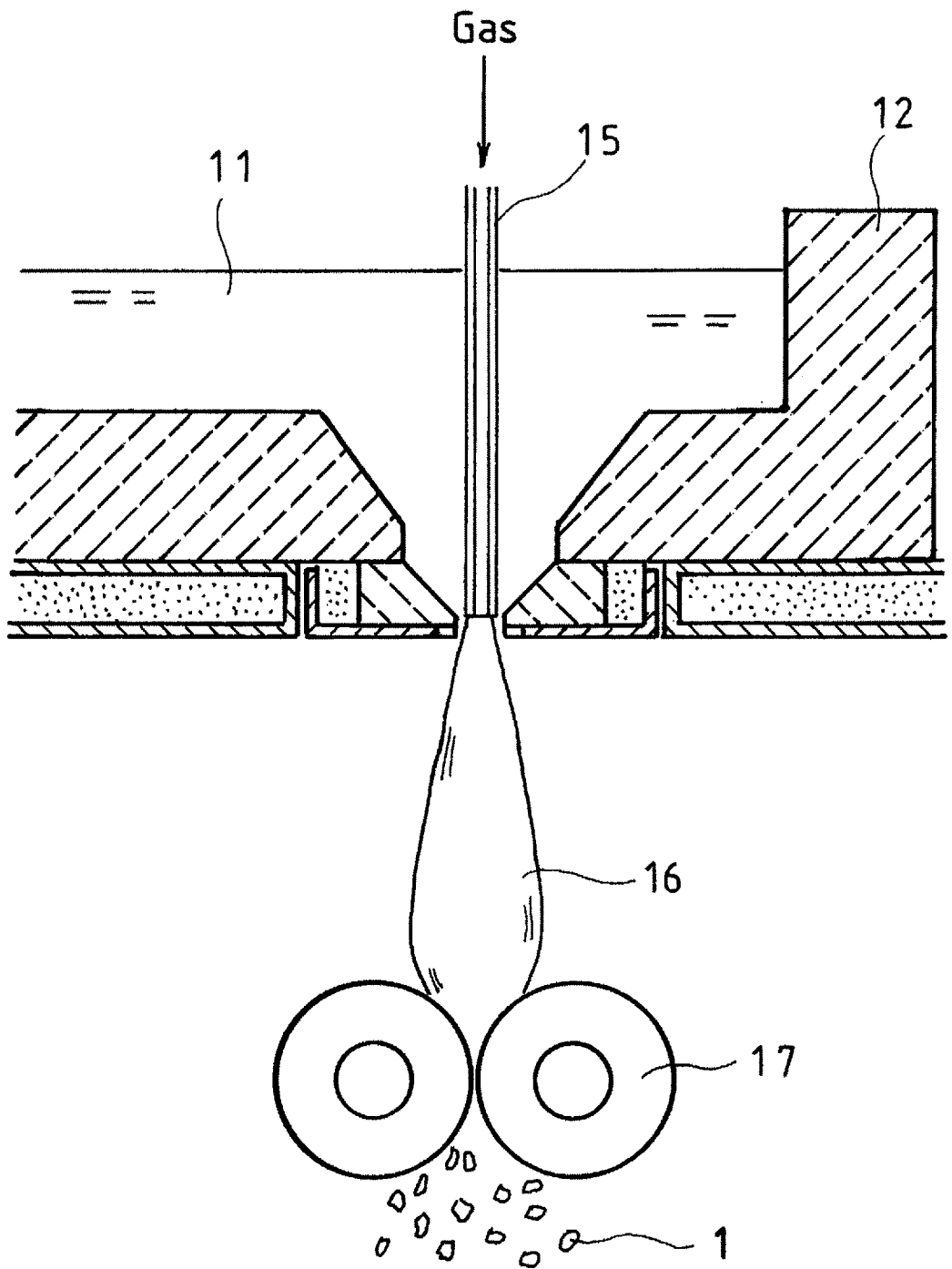
FIG. 1 is a schematic diagram illustrating an example of a production apparatus of glass flake substrates.

For the blow process, a glass production apparatus shown in FIG. 1 can be employed. The glass production apparatus is equipped with a refractory tank furnace 12, blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain glass flake substrates 1. The thickness of the glass flake substrates 1 can be controlled by adjusting, for example, the speed of pulling the hollow glass 16 and flow rate of the gas delivered through the blowing nozzle 15.

Figure 2:
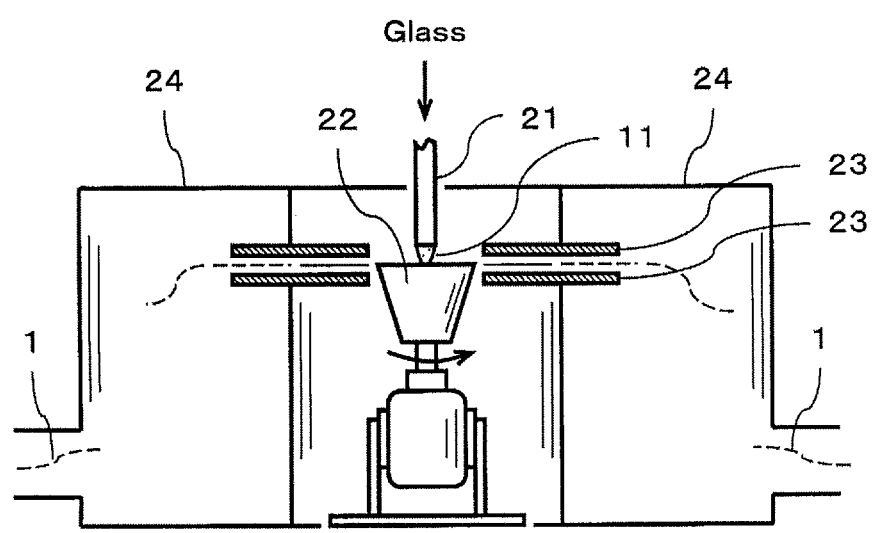
FIG. 2 is a schematic diagram illustrating another example of a production apparatus of glass flake substrates.

For the rotary process, a glass production apparatus shown in FIG. 2 can be employed. The glass production apparatus is equipped with a rotary cup 22, pair of annular plates 23, and annular cyclone collector 24. A molten glass raw material 11 is poured into the rotary cup 22, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give glass flake substrates 1. The thickness of the glass flake substrates 1 can be controlled by adjusting, for example, the distance between the annular plates 23 and velocity of the airflow.

Commonly known glass compositions can be used as the composition of the glass flake substrates. Specifically, a glass with a low alkali metal oxide content, such as E-glass, can be suitably used. A typical composition of E-glass is shown below. In the composition, the unit is mass %.

$SiO_2$: 52 to 56
$Al_2O_3$: 12 to 16
CaO: 16 to 25
MgO: 0 to 6
$Na_2O+K_2O$: 0 to 2 (Preferably 0 to 0.8)
$B_2O_3$: 5 to 13
$F_2$: 0 to 0.5

For the glass with a low alkali metal oxide content, a glass composition including the following components in mass % and substantially free of $B_2O_3$, F, ZnO, BaO, SrO, and $ZrO_2$ can be employed:

$59 \leq SiO_2 \leq 65$,
$8 \leq Al_2O_3 \leq 15$,
$47 \leq (SiO_2 - Al_2O_3) \leq 57$,
$1 \leq MgO \leq 5$,
$20 \leq CaO \leq 30$,
$0 < (Li_2O + Na_2O + K_2O) < 2$, and
$0 \leq TiO_2 \leq 5$.

This glass composition is disclosed by the present applicant in WO 2006/068255 A1.

Being "substantially free" means that the components are not intentionally included except for those inevitably introduced from, for example, industrial materials. Specifically, being "substantially free" means that the content of each of $B_2O_3$, F, ZnO, BaO, SrO, and $ZrO_2$ is less than 0.1 mass % (preferably less than 0.05 mass % and more preferably less than 0.03 mass %).

The average thickness and average particle diameter of the glass flake substrates are not particularly limited. The thinner the glass flake substrates are, the larger the aspect ratio (a value calculated by dividing the average particle diameter by the average thickness) of the glass flake substrates is, and thus the higher the blocking effect against penetration of water or gas into a resin composition filled with the glass flakes is, but the lower the workability is. The average thickness and average particle diameter can be determined in view of the balance among, for example, the blocking effect, effect of reinforcing resin molded articles, effect of decreasing the mold shrinkage factor of resin molded articles, workability, degree of technical difficulty, and product cost effectiveness. Specifically, the use of glass flake substrates with an average thickness of 7 μm or less and an aspect ratio of 50 or more for production of the glass flakes is preferred to ensure a good balance among the blocking effect, effect of reinforcing resin molded articles, effect of decreasing the mold shrinkage factor of resin molded articles, workability, and product cost effectiveness. The average thickness is preferably 2.0 μm or less to further enhance the blocking effect, effect of reinforcing resin molded articles, and effect of decreasing the mold shrinkage factor of resin molded articles. The thinner the glass flake substrates become, the more likely a resin composition formed by incorporating the glass flakes to a resin is to increase the viscosity sharply and decrease the flowability during melting of the resin. Therefore, the thinner the glass flake substrates become, the more prominent the effect of the aforementioned lubricant becomes. In view of the degree of technical difficulty and product cost effectiveness, the average thickness is preferably 0.1 μm or more. To more effectively achieve the effect of reinforcing resin molded articles, the average particle diameter is preferably 10 to 2000 μm. The average aspect ratio is preferably 2000 or less in view of the dispersibility in resins. In the present specification, the average thickness of the glass flake substrates is a value determined by extracting 100 or more glass flake substrates, measuring the thickness thereof with a scanning electron microscope (SEM), and dividing the sum of the thickness values by the number of the glass flake substrates. The average particle diameter is a particle diameter (D50) at a cumulative mass percentage of 50% in a particle size distribution measured by a laser diffraction-scattering method.

As described above, the binder forming the coating is either (a) a binder containing a lubricant other than silicone, or
(b) a binder containing a lubricant and aminosilane.

If the binder is (a), examples of the lubricant contained in the binder include alkyl imidazoline derivatives (formed by a reaction of a fatty acid and polyalkylene polyamine, for example), fatty acid-polyethylene polyamine condensates, condensates of a fatty acid, polyethyleneimine, and amide-substituted polyethyleneimine, polyethyleneimine polyamide, partially amidated polyethyleneimine, silylated polyamine lubricants, fatty acid amides, saturated or unsaturated fatty acid amides (e.g., stearic acid amide), polyunsaturated fatty acid amides, condensates of a higher saturated fatty acid and higher saturated alcohol, polyethyleneimine, paraffin, fatty acid triglycerides, soybean oil, coconut oil, rapeseed oil, palm oil, candelilla wax, carnauba wax, beeswax, lanolin, animal oils such as beef tallow and spermaceti, vegetable oils, hydrogenated products of animal oils and vegetable oils, montan wax, and mineral wax such as petroleum wax. Among these, fatty acid-polyethylene polyamine condensates, polyethyleneimine polyamide, and paraffin are suitably used.

If the binder is (b), that is, if the binder contains an aminosilane, examples of the lubricant contained in the binder can further include silicone in addition to the above examples. The aminosilane is a compound contained in the binder as a coupling agent described later. One possible reason why silicone can be used as a lubricant when the binder contains the aminosilane is as follows. Based on siloxane bonds, silicone is relatively poor in compatibility with a resin compared to hydrocarbon lubricants. A silane coupling agent is bonded to a resin via a functional group highly reactive with the resin and also has a good compatibility with silicone. Among silane coupling agents, aminosilanes are particularly highly reactive with resins. Therefore, it is conceivable that with the aminosilane contained in the binder, the effect of the lubricant on improvement of the flowability of the glass flakes can contribute to increasing the mechanical strength of resin molded articles without decreasing an interfacial adhesion between the coating and resin even when silicone is contained as the lubricant.

The proportion of the lubricant contained in the binder is 30 mass % or less and preferably 20 mass % or less. The proportion of the lubricant contained in the binder is preferably 1 mass % or more and more preferably 2 mass % or more. If the proportion of the lubricant is less than 1 mass %, the effect on improvement of the flowability of the resin composition (effect of reducing the decrease in the flowability of the resin composition due to the incorporation of the glass flakes) can be low sometimes, and thus the effect of reducing a decrease in the strength of the resultant resin molded article is unlikely to be achieved. If the proportion of the lubricant is more than 30 mass %, the effect on improvement of the flowability of the resultant resin composition is unlikely to be enhanced further, and an excess lubricant may impair the adhesion between the glass and matrix resin and thus cause a decrease in the strength of the resultant resin molded article. For example, if the proportion of the lubricant in the binder is 1 mass % or more and 30 mass % or less, the flowability of the resin composition formed by incorporating the glass flakes to a resin is improved and thus the strength property is likely to be enhanced. As a result, a resin molded article featuring a high strength and low shrinkage factor is likely to be obtained.

The binder may further contain an adhesive for granulating the glass flakes and increasing the affinity between the glass flakes and matrix resin and/or a coupling agent for increasing the affinity between the glass surface and matrix resin by reacting with the surface of the glass flake substrates. The binder may further contain a surfactant.

If the binder contains an adhesive, the adhesive is not particularly limited. Examples of organic adhesives include methylcellulose, carboxymethyl cellulose, starch, carboxymethyl starch, hydroxyethyl cellulose, hydroxypropyl cellulose, polyvinyl alcohol, acrylic resins, epoxy resins, phenolic resins, vinyl acetate, and polyurethane resins. Examples of inorganic adhesives include liquid glass, colloidal silica, and colloidal alumina.

If the binder contains a coupling agent, the coupling agent is not particularly limited. Examples include a silane coupling agent, titanium coupling agent, aluminum coupling agent, and zirconia coupling agent. Their mixtures can be used too. As the silane coupling agent, for example, an aminosilane can be used.

Examples of the aminosilane include 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, 3-triethoxysilyl-N-(1,3-dimethyl-butylidene)propylamine, and N-(vinylbenzyl)-2-aminoethyl-3-aminopropyltrimethoxysilane hydrochloride. Other examples of the silane coupling agent include 3-glycidoxypropyltrimethoxysilane, vinyltriethoxysilane, and 3-methacryloxypropyltrimethoxysilane.

The method for producing the binder is not particularly limited. For example, a solution containing the binder (binder solution) can be produced by adding components such as the lubricant to a solvent as appropriate at ordinary temperature and atmospheric pressure and then stirring the mixture to homogeneity.

In the present embodiment, for example, the binder solution containing the binder is added to the glass flake substrates, which are stirred and then dried to form a coating covering at least a portion of the surface of each of the glass flake substrates. The method for accomplishing the addition of the binder solution, stirring, and drying is not limited to specific ones. Examples of the method will be described hereinafter.

For example, the glass flake substrates are fluidized in a mixer such as a rotary disk mixer or Henschel mixer having a mixing vessel equipped with a rotating blade, a predetermined amount of the binder is added to the flowing glass flake substrates by a means such as a spray, and the glass flake substrates and binder are mixed and stirred. Then, the glass flake substrates are dried under stirring in the mixer, or the glass flake substrates are taken out of the mixer and dried. In this manner, glass flakes provided with a coating on at least a portion of the surface of each of the glass flake substrates can be obtained.

In another example, the glass flakes can be produced by tumbling granulation as described in JP H02(1990)-124732 A. That is, the glass flakes can be produced by placing the glass flake substrates in a horizontal oscillating granulator equipped with a stirring blade, spraying the binder solution onto the glass flake substrates, and performing granulation.

The glass flakes can be produced also by using known methods other than the above examples, such as methods generally called stirring granulation, fluidized bed granulation, injection granulation, and rotary granulation.

The drying step is accomplished, for example, by heating the glass flake substrates to a temperature equal to or higher than the boiling point of the solvent used in the binder solution and drying the glass flake substrates until the solvent fully evaporates.

The proportion of the coating in the glass flakes (the deposit ratio of the binder in the glass flakes) can be controlled by adjusting the concentration of the binder in the binder solution to be added or sprayed. That is, the glass flakes having a predetermined proportion of the coating composed of the binder can be produced by adding or spraying a predetermined amount of the binder solution onto a predetermined amount of the glass flake substrates so that a predetermined amount of the binder is deposited on the glass flake substrates.

The proportion of the coating in the glass flakes is preferably 0.05 to 3 mass %, more preferably 0.2 to 2 mass %, and even more preferably 0.3 to 1 mass %. If the proportion of the coating is less than 0.05 mass %, covering of the glass flake substrates by the binder may be insufficient, and the insufficient covering can cause a decrease in the strength of the resultant resin molded article. If the proportion of the coating is more than 3 mass %, extrusion molding may involve generation of a gas which causes problems such as fouling of the mold or discoloration of the resultant resin molded article. If the proportion of the coating is more than 3 mass %, the binding force between the glass flakes themselves may be so increased that insufficient kneading during resin molding can cause the glass flakes to remain as aggregates in the resultant resin molded article, thus leading to a decrease in the strength of the resultant resin molded article. Furthermore, if the proportion of the coating is more than 3 mass %, the components of the excess coating may impair the adhesion between the glass and matrix resin and thus cause a failure to achieve good properties of the resultant molded article.

Next, the resin composition of the present embodiment will be described.

The resin composition of the present embodiment includes the above-described glass flakes of the present embodiment and a matrix resin.

Examples of the matrix resin include, but are not particularly limited to, polyvinyl chloride, polybutylene, polypropylene, polyethylene, polystyrene, polyester, polyamide, polycarbonate, polybutylene, polybutylene terephthalate, copolymers thereof, polyphenylene sulfide, polyphenylene ether, modified polyphenylene ether, polyetheretherketone, and liquid crystal polymers (types I, II, and III).

A resin composition including conventional glass flakes requires the use of a matrix resin having a low molecular weight to ensure a flowability of the resin composition at or above a certain level. However, with the use of the glass flakes of the present embodiment, the decrease in the flowability of the resin composition due to the incorporation of the glass flakes can be reduced, and thus a resin having a high molecular weight can be used as the matrix resin. Therefore, the resin composition of the present embodiment can impart high mechanical strength to the resultant resin molded article by the use of a resin having a high molecular weight as the matrix resin.

The content of the glass flakes in the resin composition is preferably 5 to 70 mass %. Controlling the content to 5 mass % or more allows the glass flakes to fully exhibit their function as a reinforcing material. Controlling the content to 70 mass % or less makes it easier to uniformly disperse the glass flakes in the resin composition. To further reduce the mold shrinkage factor, the content of the glass flakes is more preferably 30 mass % or more.

The resin composition may, depending on its intended use, contain a reinforcing material other than the glass flakes, such as glass fibers. For example, when the resin composition is used for a part of an electric or electronic device, the resin composition may contain glass fibers in an amount comparable to that of the glass flakes since such a part needs to have very high strength.

Owing to the reinforcing effect of the glass flakes, a resin molded article produced using the resin composition of the present embodiment can have high tensile strength and high flexural strength. Additionally, since the mold shrinkage factor of the resin composition of the present embodiment is low, a resin molded article having high dimensional stability can be obtained using the resin composition. Furthermore, since the glass flakes included in the resin composition of the present embodiment have a smaller average thickness than glass flakes contained in conventional resin compositions, a molded article having a smooth surface with small surface roughness can be obtained using the resin composition of the present embodiment.

EXAMPLES

Hereinafter, the present invention will be described in more detail using examples. The present invention is not limited to the examples given below, and other examples are possible as long as they do not depart from the gist of the present invention.

Examples 1 to 8

(Glass Flakes)

First, glass flake substrates were produced by the blow process using E-glass having the composition shown in Table 1. Specifically, the E-glass was placed and melted in a melting furnace heated to 1200° C. or higher. A nozzle was put in the melting furnace, and then air was blown from the nozzle to form thin glass. The thin glass was continuously pulled out by the rollers. The amount of the blown air and rotation speed of the rollers were adjusted to obtain glass having an average thickness of 0.7 μm. Afterwards, the thin glass was crushed and then classified to obtain glass flake substrates having an average particle diameter of 160 μm.

TABLE 1

|  | (Unit: mass %) E-glass |
|---|---|
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Others | 1.2 |

Next, 5 kg of the glass flake substrates were placed in a Henschel mixer. While a binder solution was being added by spraying, the contents of the mixer were mixed and stirred for 15 minutes. The binder solution contained a lubricant, adhesive, and silane coupling agent as the binder components (solids) and water as a solvent. As the lubricant, a fatty acid-polyethylene polyamine condensate (Sofnon GW-18 manufactured by TOHO Chemical Industry Co., Ltd.), polyethyleneimine polyamide (KATAX 6717L manufactured by Pulcra Chemicals), paraffin (KEW J-200 manufactured by KAN-EI INDUSTRY CO., LTD.), or a hydrogen group-containing silicone emulsion (Polon MWS manufactured by Shin-Etsu Chemical Co., Ltd.) was used. As the adhesive, a polyurethane resin (Impranil DLS manufactured by Sumika Bayer Urethane Co., Ltd.) was used. As the silane coupling agent, 3-aminopropyltriethoxysilane (Sila-Ace 5330 manufactured by JNC Corporation) was used. Table 3 shows the proportion of each of the binder components contained in the binder solutions used in Examples 1 to 8. After the mixing and stirring, the glass flakes (undried) were taken out of the mixer and dried by a dryer at 125° C. for 8 hours. Glass flakes of Examples 1 to 8 were thus obtained.

The deposit ratio of the binder in the obtained glass flakes was examined by loss on ignition. Specifically, a proper amount of the glass flakes was extracted from the obtained glass flakes, dried at 110° C., and then heated in an atmosphere at 625° C. to remove the binder from the surface of the glass flakes. The deposit ratio of the binder in the glass flakes was calculated from the difference between the mass of the glass flakes before the heating and the mass of the glass flakes after the heating. Table 3 shows the results.

Comparative Example 1

Glass flakes of Comparative Example 1 were obtained in the same manner as in Example 1, except for adjusting the amounts of the components (adhesive and silane coupling agent) in the binder solution so that the proportion of the lubricant (solids) would account for more than 30 mass % of the binder components (solids) in the binder solution. The deposit ratio of the binder in the glass flakes was determined in the same manner as that in the glass flakes of Examples 1 to 8.

Comparative Example 2

Glass flakes of Comparative Example 2 were obtained in the same manner as in Examples 1 to 8, except for including no lubricant in the binder solution and adjusting the amounts of the components (adhesive and silane coupling agent) in the binder solution. The deposit ratio of the binder in the glass flakes was determined in the same manner as that in the glass flakes of Examples 1 to 8.

(Resin Molded Article)

The glass flakes of each of Examples and Comparative Examples and a matrix resin were kneaded by an extrusion molding machine (KZW15-30MG manufactured by Technovel Corporation, molding temperature: about 270 to 320° C.) to obtain a resin composition including the glass flakes as a reinforcing filler and the matrix resin. In each of Examples and Comparative Examples, three matrix resins were used. That is, three resin compositions were obtained in each of Examples 1 to 8 and Comparative Examples 1 and 2. Each resin composition was molded by an injection molding machine (HM7 manufactured by NISSEI PLASTIC INDUSTRIAL CO., LTD.) to obtain a resin molded article. The content of the glass flakes in the obtained resin molded article was 50 mass %. As the matrix resin, PA66 (AMILAN CM3001-N manufactured by TORAY INDUSTRIES, INC.), PA9T (Genestar N1000A manufactured by KURARAY CO., LTD.), both of which are a polyamide, or PPE (Xyron 500V manufactured by Asahi Kasei Chemicals Corporation), which is a modified polyphenylene ether, was used.

[Evaluation of Properties]

(Ease of Incorporation of Glass Flakes)

The glass flakes were put in a sieve having an aperture of 2 mm and sifted to evaluate the ease of incorporation of the glass flakes by visually checking how smoothly the glass flakes fall and the degree of attachment thereof to the sieve. The evaluation was carried out according to Table 2 below. The more smoothly the glass flakes fall and the less amount of the glass flakes attached to the sieve is, the less likely imperfect blending of the glass flakes with the resin is to occur due to, for example, attachment to a part of the extruder. If imperfect blending is less likely to occur, the glass flakes can be incorporated to the resin sufficiently without using a feeder having a high supply capability and the proportion of the glass flakes is likely to be uniform in the resin composition. Table 3 shows the results.

TABLE 2

| Evaluation score | How smoothly glass flakes fall and degree of attachment to sieve |
| --- | --- |
| 1 | Glass flakes fall unsmoothly and many of them are attached. |
| 2 | Glass flakes fall moderately smoothly and many of them are attached. |
| 3 | Glass flakes fall moderately smoothly and some of them are attached. |
| 4 | Glass flakes fall quickly and some of them are attached. |
| 5 | Glass flakes fall quickly and a few of them are attached. |

(Strength Property of Resin Molded Article)

The tensile strength was measured to evaluate the strength property of the resin molded articles. The tensile strength was measured according to JIS K 7113. Table 3 shows the results.

(Filling Factor of Resin Molded Article)

The filling factor was determined to evaluate the flowability of the resin compositions during molding. Filling with each of the resin compositions was performed with the injection speed of the injection molding machine set to the lower limit at which it is difficult to fill a mold cavity with a resin. With a low injection speed, a molten resin composition is cooled to a solid before thoroughly filling the mold, which makes it difficult to fill up a mold cavity with the resin composition. The filling factor was calculated by the following equation. The higher the filling factor is, the higher the flowability is. Table 3 shows the results. The term "weight of molded article (normal)" as used in the following equation refers to the weight of a molded article formed when the injection speed is normal. Saying that "the injection speed is normal" means that the injection speed is set to allow the resin to fill 100% of the mold cavity. That is, the term "weight of molded article (normal)" refers to the weight of a molded article obtained when the resin fills 100% of the mold cavity.

Filling factor[%]={weight of molded article(lower limit of injection speed)/weight of molded article(normal)}×100

TABLE 3

| | | Example 1 | Example 2 | Example 3 | Example 4 | Example 5 | Example 6 | Example 7 | Example 8 | Compar. Example 1 | Compar. Example 2 |
| --- | --- | --- | --- | --- | --- | --- | --- | --- | --- | --- | --- |
| Binder components (mass %) | 3-aminopropyltriethoxysilane | 54.1 | 54.1 | 54.1 | 54.1 | 58.9 | 58.3 | 42.3 | 59.2 | 39.5 | 59.5 |
| | Urethane resin | 36.7 | 36.7 | 36.7 | 36.7 | 40.1 | 39.7 | 28.7 | 40.3 | 26.9 | 40.5 |
| Lubricant | Fatty acid-polyethylene polyamine condensate | 9.2 | — | — | — | 1.0 | 2.0 | 29.0 | 0.5 | 33.6 | — |
| | Polyethyleneimine polyamide | — | 9.2 | — | — | — | — | — | — | — | — |
| | Paraffin | — | — | 9.2 | — | — | — | — | — | — | — |

TABLE 3-continued

|  |  |  | Example 1 | Example 2 | Example 3 | Example 4 | Example 5 | Example 6 | Example 7 | Example 8 | Compar. Example 1 | Compar. Example 2 |
|---|---|---|---|---|---|---|---|---|---|---|---|---|
|  |  | Hydrogen group-containing silicone emulsion | — | — | — | 9.2 | — | — | — | — | — | — |
|  | Deposit ratio of binder (mass %) |  | 0.43 | 0.44 | 0.41 | 0.43 | 0.40 | 0.40 | 0.54 | 0.40 | 0.58 | 0.40 |
|  | Ease of incorporation of glass flakes |  | 5 | 5 | 5 | 5 | 3 | 4 | 5 | 2 | 5 | 1 |
| Properties of molded article | PA66 | Tensile strength (MPa) | 136.4 | 137.4 | 132.2 | 139.9 | 132.8 | 135.6 | 135.1 | 129.1 | 125.3 | 126.0 |
|  |  | Filling factor (%) | 100 | 100 | 100 | 100 | 86 | 90 | 100 | 73 | 100 | 68 |
|  | PA9T | Tensile strength (MPa) | 132.8 | 134.6 | 130.1 | 138.0 | 129.1 | 131.8 | 129.9 | 122.8 | 115.6 | 119.6 |
|  |  | Filling factor (%) | 100 | 100 | 100 | 100 | 90 | 100 | 100 | 78 | 100 | 74 |
|  | PPE | Tensile strength (MPa) | 99.4 | 100.0 | 98.3 | 100.0 | 91.8 | 94.6 | 95.0 | 87.6 | 87.9 | 85.8 |
|  |  | Filling factor (%) | 68 | 68 | 67 | 68 | 60 | 68 | 68 | 47 | 69 | 45 |

Comparison of the results for Examples 1 to 8 and the results for Comparative Examples 1 and 2 shown in Table 3 reveals that, when the binder contained 30 mass % or less of the lubricant, the glass flakes showed a good result in the evaluation of the ease of incorporation, the flowability during molding was good, and the resin molded articles showed a high level of the strength property. Particularly in Examples 1 to 7 in which the glass flakes included the lubricant at a proportion of 1 mass % or more and 30 mass % or less in the binder, the glass flakes showed a better result in the ease of incorporation, the flowability during molding was good, and the resin molded articles showed a high level of the strength property.

When the proportion of the lubricant contained in the binder was 2 mass % or more and 30 mass % or less (i.e., in Examples 1 to 4, 6, and 7), the evaluation score of the ease of incorporation of the glass flakes was 4 or higher, the filling factor, which indicates the flowability during molding, of the resin molded articles formed using the polyamides as the matrix resins was as high as 90% or more, and the tensile strength of the resin molded articles was also high. Particularly in Example 4 using silicone as the lubricant, the resin molded articles achieved high strength properties.

INDUSTRIAL APPLICABILITY

When mixed in a resin, the glass flakes of the present invention can achieve both effective reinforcement of resin molded articles and provision of good appearances thereto, and are therefore applicable to various uses. For example, the glass flakes of the present invention and a resin composition including the glass flakes are suitably used in the automotive field, electrical and electronic part field, etc.

The invention claimed is:

1. A resin composition comprising:
   glass flakes comprising
   glass flake substrates; and
   a coating covering at least a portion of the surface of each of the glass flake substrates and composed of a binder, wherein
   the binder comprises a lubricant and an aminosilane,
   the lubricant comprises silicone,
   the proportion of the lubricant in the binder is 1 mass % or more and 30 mass % or less, and
   the glass flake substrates have an average thickness of 0.1 to 7 μm and an average particle diameter of 10 to 2000 μm; and
   a matrix resin.

2. The glass flakes according to claim 1, wherein the glass flake substrates have an average thickness of 0.1 to 2 μm and an average particle diameter of 10 to 2000 μm.

3. The resin composition according to claim 1, wherein the matrix resin comprises a polyamide.

4. The resin composition according to claim 3, wherein the polyamide is at least one selected from the group consisting of PA66 and PA9T.

5. The resin composition according to claim 1, wherein the matrix resin comprises a modified polyphenylene ether.

* * * * *